(12) United States Patent
Kibashi et al.

(10) Patent No.: US 6,549,973 B1
(45) Date of Patent: Apr. 15, 2003

(54) METHOD AND APPARATUS FOR PREDICTING RECOVERY TIME OF HARD DISK DRIVE

(75) Inventors: Akira Kibashi, Zama (JP); Hideo Asano, Machida (JP); Daniel J. Colegrove, Henderson, NV (US)

(73) Assignee: Hitachi Global Storage Technologies The Netherlands B.V., Amsterdam (NL)

(*) Notice: Subject to any disclaimer, the term of this patent is extended or adjusted under 35 U.S.C. 154(b) by 0 days.

(21) Appl. No.: 09/575,207

(22) Filed: May 18, 2000

(30) Foreign Application Priority Data

Jun. 14, 1999 (JP) .......................................... 11-166238

(51) Int. Cl.⁷ .............................................. G06F 12/00
(52) U.S. Cl. ............................ 711/4; 713/323; 711/166
(58) Field of Search ........................... 711/112, 4, 166; 710/7, 17, 19; 360/73.06; 713/323, 340, 324

(56) References Cited

U.S. PATENT DOCUMENTS

| | | | | |
|---|---|---|---|---|
| 5,345,561 A | * | 9/1994 | Kato | 360/71 |
| 5,412,809 A | * | 5/1995 | Tam et al. | 713/324 |
| 5,954,820 A | * | 9/1999 | Hetzler | 713/313 |
| 6,043,950 A | * | 3/2000 | Kim | 360/73.03 |
| 6,304,405 B1 | * | 10/2001 | Asano et al. | 360/53 |

FOREIGN PATENT DOCUMENTS

| | | | | |
|---|---|---|---|
| JP | 06-019823 | 1/1994 | ........... G06F/13/10 |
| JP | 06-139749 | 5/1994 | ........... G11B/25/04 |
| JP | 08-087383 | 4/1996 | ........... G06F/3/06 |
| JP | 08-153057 | 6/1996 | ........... G06F/13/10 |
| JP | 11-015606 | 1/1999 | ........... G06F/3/12 |
| JP | 02001014107 A | * | 1/2001 | |

OTHER PUBLICATIONS www.pctechguide.com, "The PC Technology Guide (SMART)", pp. 4–5, Mar. 11, 2002.*
G. Herbst, "IBM's Drive Temperature Indicator Processor (Drive–TIP) Helps Ensure High Drive Reliability", pp. 2–7, Oct. 1997.*
Galvin and Silberschatz, "Operating System Concepts 5th edition", pp. 32–34, 1999.*
Benini, Luca, et al., "A Survey of Design Techniques for System–Level Dynamic Power Management", IEEE Transactions on Very Large Scale Integration, vol. 8, No. 3, Jun. 2000, pp. 299–316.*

* cited by examiner

*Primary Examiner*—Matthew Kim
*Assistant Examiner*—Pierre-Michel Bataille
(74) *Attorney, Agent, or Firm*—Robert B. Martin; Lewis L. Nunnelley

(57) ABSTRACT

A method and an apparatus for predicting the recovery time required until the hard disk drive is restored to a usable state from a stand-by state. The recovery time is a time required until the hard disk drive is restored to a usable state from the stand-by state. Then, the predicted recovery time is reported to the host system. When the host system knows how much time is needed until the disk drive is recovered, it can schedule a task to be completed before the hard disk drive is restarted, thereby scheduling of all the tasks in the host system can be optimized.

1 Claim, 2 Drawing Sheets

Restarting time $t_s$ lookup table

| Rotation speed (rpm) \ Temperature (°C) | 5 | 15 |
|---|---|---|
| 0 | 10.2 (sec) | ------ |
| 500 | ------ | ------ |
| 1000 | ------ | ------ |

Restarting time $t_s$ lookup table

| Rotation speed (rpm) \ Temperature (°C) | 5 | 15 |
|---|---|---|
| 0 | 10.2 (sec) | ------- |
| 500 | ------- | ------- |
| 1000 | ------- | ------- |

METHOD AND APPARATUS FOR PREDICTING RECOVERY TIME OF HARD DISK DRIVE

TECHNICAL FIELD

The present invention relates to a method and an apparatus for predicting the recovery time of a hard disk drive power supply from a waiting state in a system provided with the hard disk drive.

BACKGROUND OF THE INVENTION

Usually, in a system provided with a hard disk drive, the priority of each read/write task in the hard disk drive is high and accordingly, each task requires a fast response. However, once the hard disk drive stops its spindle motor and unloads the actuator so as to save power, the hard disk drive takes a long time to restore the spindle motor and the actuator to a usable state.

That is, if a host system transmits a power save command to the a hard disk drive, the hard disk drive enters a stand-by mode or a sleep mode in response to the received command. In the stand-by mode, only the interface circuit of the host system is active, so that the host system can receive commands. However, all other components of the host system are in a power-off state. In the sleep mode, all the operations of the host system enter the power-off state. To be restored from this mode, the host system receives a hard reset command or a soft reset command. The time required until the host system exits the stand-by or sleep mode to enter an idle mode or execute a read/write operation is considered as a recovery time, mainly consisting of the time it takes until the spindle motor reaches a predetermined rotation speed (also referred to as a time required for restarting the spindle motor) and the time required until the actuator is released from an unloaded position so as to calibrate the servo, then moved to a predetermined cylinder (also referred to as a time required for moving the actuator to a predetermined cylinder). So far, this recovery time of the power supply has been long.

In a system provided with a conventional hard disk drive, the host system had to wait without executing any task during a period of time between when the hard disk drive was restored from a stand-by state for power saving (for example, the spindle motor was stopped and the actuator was unloaded) to a usable state. Consequently, the time required for restoration from a stand-by state was wasteful. It took several seconds until the spindle motor was restarted in some cases. This has been a serious problem for hard disk drives for which fast responses are expected.

Under such circumstances, it is an object of the present invention to provide a method and an apparatus for predicting a recovery time, to be employed in a system provided with a hard disk drive that can solve the above conventional problems and speed up the processing in the whole system provided with such a hard disk drive with efficient use of a recovery time of the power supply to restore from a stand-by state, as well as a hard disk drive that uses the method.

SUMMARY OF THE INVENTION

Figure 1:
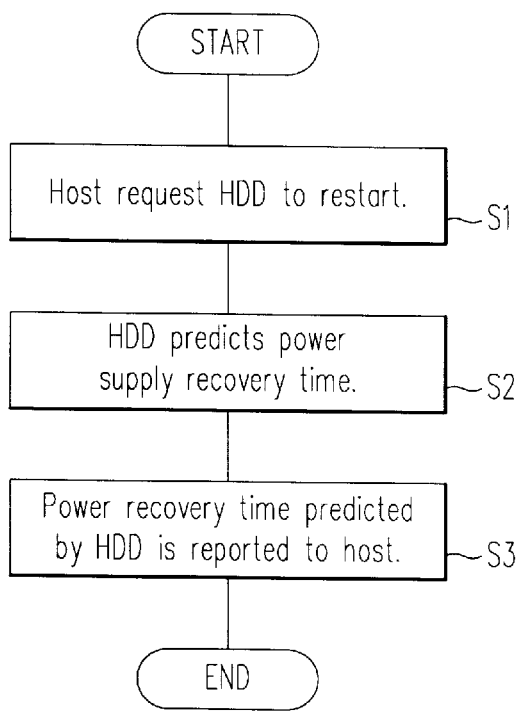
FIG. 1 is a flowchart showing how to predict a recovery time according to the present invention in a system provided with a hard disk drive.

According to the method of the present invention for predicting a recovery time, a power supply recover time (time required until a hard disk drive is restored to a usable state from a stand-by state) is predicted when a host system requests the hard disk drive to exit the stand-by state. Next, the predicted recovery time of the power supply is reported to the host system.

According to the present invention, the host system will know the time required until the power supply is recovered. Consequently, the host system can schedule a task to be executed within this period of time before the hard disk drive is restarted, so that scheduling of all the tasks to be executed in the whole system can be optimized. Consequently, it is possible to significantly speed up the processing in the whole system provided with a hard disk drive. In addition, depending on the type of those system, the host system can notify the user of the time required until the response is returned.

In a preferred example according to the present invention, the hard disk drive predicts a power supply recovery time by itself with reference to its current state and the past operating history. In addition, the hard disk drive calculates a power supply recovery time as follows: if the time required until the spindle motor is restarted is $t_S$, and the time required until the actuator is moved to a predetermined cylinder is $t_V$, then the power supply recovery time is $t_R$.

$$t_R = t_S + t_V$$

Furthermore, the hard disk drive calculates a time $t_S$ required until the spindle motor thereof is restarted as follows;

$$t_S = f(Rc)$$

or $$t_S = k \cdot f(Rc),$$

where Rc is the current rotation speed, f(Rc) is a time required until the spindle motor is restarted at Rc and at a reference temperature, k is a temperature correction coefficient (k=g(T)), and T is the current temperature value.

Then, the hard disk drive corrects the power supply recovery time calculated as described above according to the current temperature. In any case, the power supply recovery time can be predicted more accurately.

The apparatus of the present invention for predicting a recovery time includes a device for receiving a predetermined signal from outside, a device for predicting a time required until the apparatus is restored to a predetermined state in response to the predetermined signal, and a device for reporting the predicted recovery time to outside. Preferably, the device for predicting the recovery time should include a device for detecting a temperature of the apparatus and a step for calculating a recovery time from the detected temperature. The hard disk drive of the present invention provided with a spindle motor for rotating a disk includes a device for receiving a predetermined signal from a host system, a device for detecting the rotation speed of the spindle motor, a device for calculating a hard disk drive recovery time from the detected rotation speed, and a device for reporting the calculated recovery time to the host system. The method of the present invention for predicting a recovery time can be realized in a preferred embodiment.

DETAILED DESCRIPTION OF THE INVENTION

FIG. 1 is a flowchart showing an example of the recovery time predicting method of the present invention, employed for a system provided with a hard disk drive. With respect to FIG. 1, at first, the host system requests the hard disk drive (described as HDD in FIG. 1) in a stand-by state to exit the stand-by state (step S1). Actually, the host system issues a power save reset request or a read/write request to the hard disk drive in a power save state. After receiving a restart request from the host system via an interface, the hard disk predicts a recovery time of the power supply required to be restored from the stand-by state to a usable state (step S2). In this case, the hard disk drive predicts a power supply recovery time by itself with reference to the current state and the past operation history thereof. After that, the hard disk drive reports the predicted recovery time of the power supply to the host system (step S3), then exiting the processing.

This completes the description of the recovery time predicting method of the present invention, employed for a system provided with a hard disk drive. Upon receiving the predicted recovery time of the power supply, the host system can know the time required until, for example, the hard disk drive is enabled for a read/write operation. Consequently, at the time of considering the whole system, it is possible to allocate tasks efficiently in the system with use of a method for allocating a task to be finished before the power supply is recovered. Consequently, the present invention can speed up the processing in the whole system provided with a hard disk drive. If the host system is, for example, a personal computer, then the user can be notified of the time when the restarting of the hard disk drive will be completed with use of a method for displaying the remaining time of the power supply recovery time in real time on a display unit.

Hereunder is a detailed description of how to request restarting, how to report a predicted value, and how to predict a recovery time of a power supply according to the present invention. When a host, system requests a hard disk drive to restart, the host system first sends a dedicated command (ex., '84h') to the hard disk drive. The command is newly added to that processing. In the above embodiment, the recovery time of a power supply is the total time required until the spindle motor is restarted and the actuator is moved to a predetermined cylinder. If such a power supply recover time is assumed to include a specific time in addition to the above two times in a read operation, a write operation, or another operation, then it is possible to design the recovery time predicting method of the present invention so that a type of a power supply recovery time which the host system wants to know, for example, the type of a power supply recovery time in a read operation, a write operation, or another operation is sent back to the host system when the host system sends the above dedicated command to the hard disk drive. The hard disk drive can send a predicted power supply recovery time to the host system, for example, a value can be sent as one-byte information in units of 100 msec via sector count register.

How to predict a power supply recovery time will be described next. As described above, a power supply recovery time is predicted by predicting both of the time required for restarting the spindle motor and the time required for moving the actuator to a predetermined cylinder, then adding up both of the times. More specifically, if it is assumed that a power supply recovery time is $t_R$, a time required for restarting the spindle motor is $t_S$, and a time required for moving the actuator to a predetermined cylinder is $t_V$, then the following expression is given and the power supply recovery time $t_R$ can be described.

$$t_R = t_S + t_V \quad (1)$$

The power supply recovery time $t_R$ can be predicted from this expression (1).

In the above expression (1), the time $t_V$ for moving the actuator to a predetermined cylinder is always considered to be fixed. The time is actually measured at the time of delivery from the factory and is stored and used. On the other hand, the time for restarting the spindle motor varies according to the rotation speed of the spindle motor when the restarting begins. In other words, the restarting time $t_S$ varies between when the spindle motor is stopped completely (rotation speed: 0) and when the spindle motor is still rotating. The $t_S$ should preferably be calculated by the following expression (2).

$$t_S = f(Rc) \quad (2)$$

Where Rc is the current rotation speed and f(Rc) is a time required for restarting the spindle motor at Rc and at a reference temperature (ex., 25° C.).

Furthermore, because the time $t_S$ required for restarting the spindle motor varies according to the ambient temperature, the time $t_S$ should preferably be calculated by the following expression (3).

$$t_S = k \cdot f(Rc) \quad (3)$$

Where k is a temperature coefficient (k=g(T) and T is the current temperature.

Figure 2:
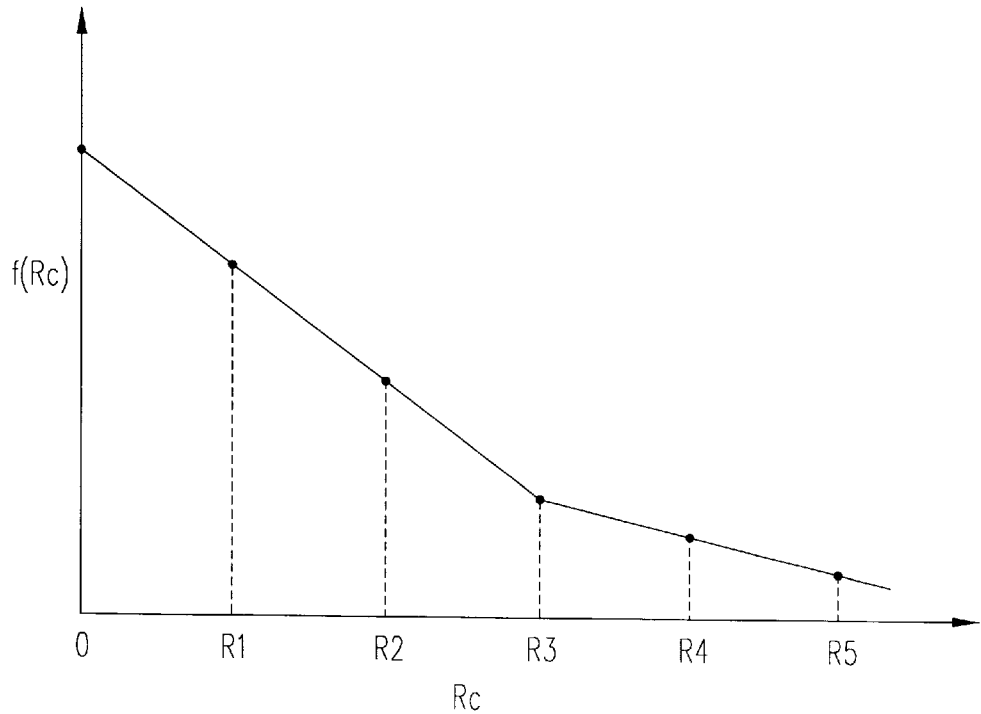
FIG. 2 is a graph indicating the relationship between f(Rc) and Rc at a reference temperature, where f(Rc) is a time required for restarting the spindle motor and Rc is a rotation speed.

The above expressions (1) and (2) or (3) are combined as needed to predict the power supply recovery time $t_R$. How to realize this power supply recovery time $t_R$ will be described next. At first, an example for calculating the f(Rc) value by making approximations for a line graph will be described. In this example, a graph is first created showing the time required for restarting the spindle motor at a certain temperature (T) and at a certain rotation speed (Rc) based on a test performed before the delivery from the factory. The graph indicates the relationship between f(Rc) and Rc at a reference temperature (ex., 25° C.). FIG. 2 shows such a graph. In FIG. 2, there is test data of Rc found at each of 0, R1, R2, R3, R4, and R5. Then, a linear function slope and an intercept in each section of the rotation speed Rc, (that is, in each of the sections 0 to R1, R1 to R2, R2 to R3, R3 to R4, and R4 to R5) are stored in a table format beforehand in the hard disk drive. In this case, after delivery from the factory, the table held in the hard disk drive is updated every time by actually measuring values of both the rotation speed Rc and the time f(Rc) required for restarting the spindle motor. Then, when the host system issues a restart command, the rotation speed Rc of the spindle motor is read by any means and the f(Rc) value, that is, the $t_S$ value is calculated from the line graph shown in FIG. 2 with reference to the table according to the Rc value. Then, the $t_S$ value is added to $t_V$ calculated beforehand, thereby predicting the power supply recovery time $t_R$.

Figures 3, 4:
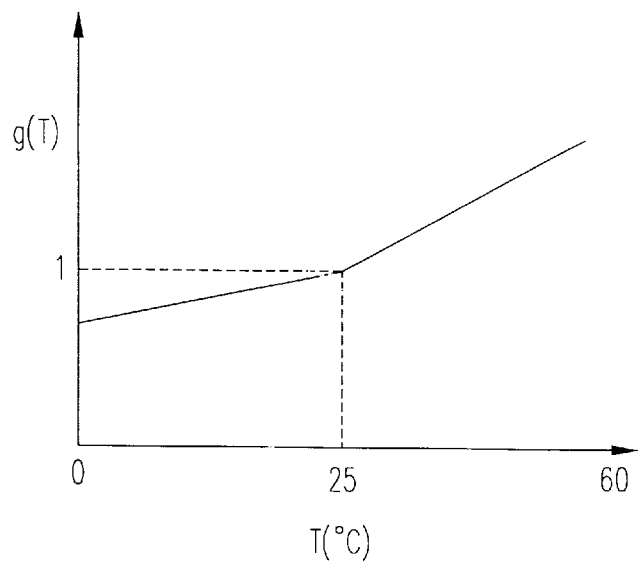
FIG. 3 is a graph indicating the relationship between T (temperature) and g(T) (temperature correction coefficient)
FIG. 4 shows an example of part of a lookup table.

To correct for the temperature, a graph indicating the relationship between the temperature T and g(T) is created according to the values measured at the time of delivery from the factory. At this time, k=g(T) at the reference temperature in FIG. 2 is assumed as 1. FIG. 3 shows such a graph. The range of the temperature T should cover the temperature range of the hard disk drive, for example, 5 to 55° C. The graph shown in FIG. 3 is held in the hard disk drive so that both linear function slope and intercept in each section are tabulated. Then, when the host system issues a restart command, the temperature T is read by any means and the g(T), that is, a temperature correction coefficient k, is calculated with reference to the table according to the read temperature T value. The power supply recovery time $t_R$ can be predicted using of the temperature correction coefficient determined as described above. In this case, f(Rc) described above is considered as k·f(Rc).

The power supply recovery time $t_R$ can also be determined in another way, for example, from a lookup table. In such an example, the lookup table is created according to the time required for restarting the spindle motor at a certain temperature and at a certain rotation speed, both determined in tests performed at the time of delivery just like in the above example. FIG. 4 shows part of such a lookup table. When the host issues a restart command, the temperature and the rotation speed of the spindle motor are read by any means, then the lookup table is referenced according to the read temperature and the rotation speed of the spindle motor, thereby calculating the time $t_S$ for restarting the spindle motor. This $t_S$ value is added to $t_V$ calculated beforehand, thereby the power supply recovery time $t_R$ can be predicted.

An example of the dependency of the restarting time $t_S$ of the spindle motor on the temperature is as shown below.

5° C.→10.2 sec

25° C.→10.4 sec

55° C.→11.6 sec

This completes the description of the method and apparatus of the present invention to predict a power supply recovery time. The recovery time predicting apparatus and the hard disk drive of the present invention are thus composed so as to predict the recovery time of the present invention in a preferred embodiment as described above. More specifically, the recovery time predicting apparatus of the present invention includes a device for receiving a predetermined signal from outside, a device for predicting a time required for recovering the apparatus to a predetermined state in response to the predetermined signal, and a device for reporting the predicted recovery time to outside. Preferably the recovery time predicting device should include a device for detecting the temperature of the apparatus and a step for calculating a recovery time from the detected temperature. In addition, the hard disk drive of the present invention has a spindle motor for rotating a disk. The hard disk drive also includes a device for receiving a predetermined signal from a host system, a device for detecting the rotation speed of the spindle motor, a device for calculating a recovery time of the hard disk drive from the detected rotation speed, and a device for reporting the calculated recovery time to the host system.

As to be understood from the above description, according to the present invention, the host system can know how much time is required until the power supply is recovered. It is thus possible to schedule a task to be ended within the power recovery processing so that it is executed before the hard disk drive is restarted. It is thus possible that scheduling of all the tasks in the host system can be optimized. Consequently, the processing speed of the whole system provided with a hard disk drive can be sped up significantly. In addition, depending on the type of the host system, the host system can notify the user of the time required until the user receives the object response.

We claim:

1. A method for predicting a recovery time of a hard disk drive connected to a computer, said disk drive including an actuator and a spindle motor to rotate a disk, comprising:

predicting the recovery time of the hard disk drive from a stand-by state to a usable state when the hard disk drive receives a request from the computer to exit the stand-by state; and, reporting the predicted recovery time of the hard disk drive to the computer, wherein the recovery time is predicted with the formula:

$$t_r = t_s + t_v$$

wherein $t_s$ is the time for restarting the spindle motor of the hard disk drive, $t_v$ is the time for moving the actuator of the hard disk drive to a predetermined location over the disk, and $t_r$ is the recovery time of the hard disk drive.

* * * * *